(12) United States Patent
Okada et al.

(10) Patent No.: US 6,454,344 B2
(45) Date of Patent: Sep. 24, 2002

(54) CONTROL APPARATUS FOR OPENING AND CLOSING A CONVERTIBLE TOP OF A VEHICLE

(75) Inventors: Shoji Okada; Toshiro Maeda, both of Anjo; Seika Matsui, Chiryu, all of (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/792,586

(22) Filed: Feb. 26, 2001

(30) Foreign Application Priority Data

Feb. 25, 2000 (JP) .................................... 2000-049437

(51) Int. Cl.[7] .............................. B60J 7/18; B60J 7/185
(52) U.S. Cl. .................. 296/121; 296/224; 292/DIG. 5
(58) Field of Search ............................... 296/121, 224; 292/DIG. 5

(56) References Cited

U.S. PATENT DOCUMENTS 4,749,193 A    6/1988   Häcker 5,839,778 A    11/1998  Schaible et al.

Primary Examiner—Joseph D. Pape
Assistant Examiner—H. Gutman
(74) Attorney, Agent, or Firm—Burns, Doane, Swecker & Mathis, LLP

(57) ABSTRACT

A control apparatus for opening and closing a convertible top of a vehicle includes first detecting device for outputting a first signal representing that a movable roof is closed, a second detecting device for outputting a second signal representing that a locking mechanism is in a locked condition, a third detecting device for outputting a third signal representing that a driving mechanism is turned to an excessive load condition, and a controller for controlling the driving mechanism according to the first signal, the second signal and the third signal. The controller includes a processing device for executing an error step when the third signal is inputted to the controller and the second signal is not inputted to the controller while the first signal is inputted to the controller.

17 Claims, 4 Drawing Sheets

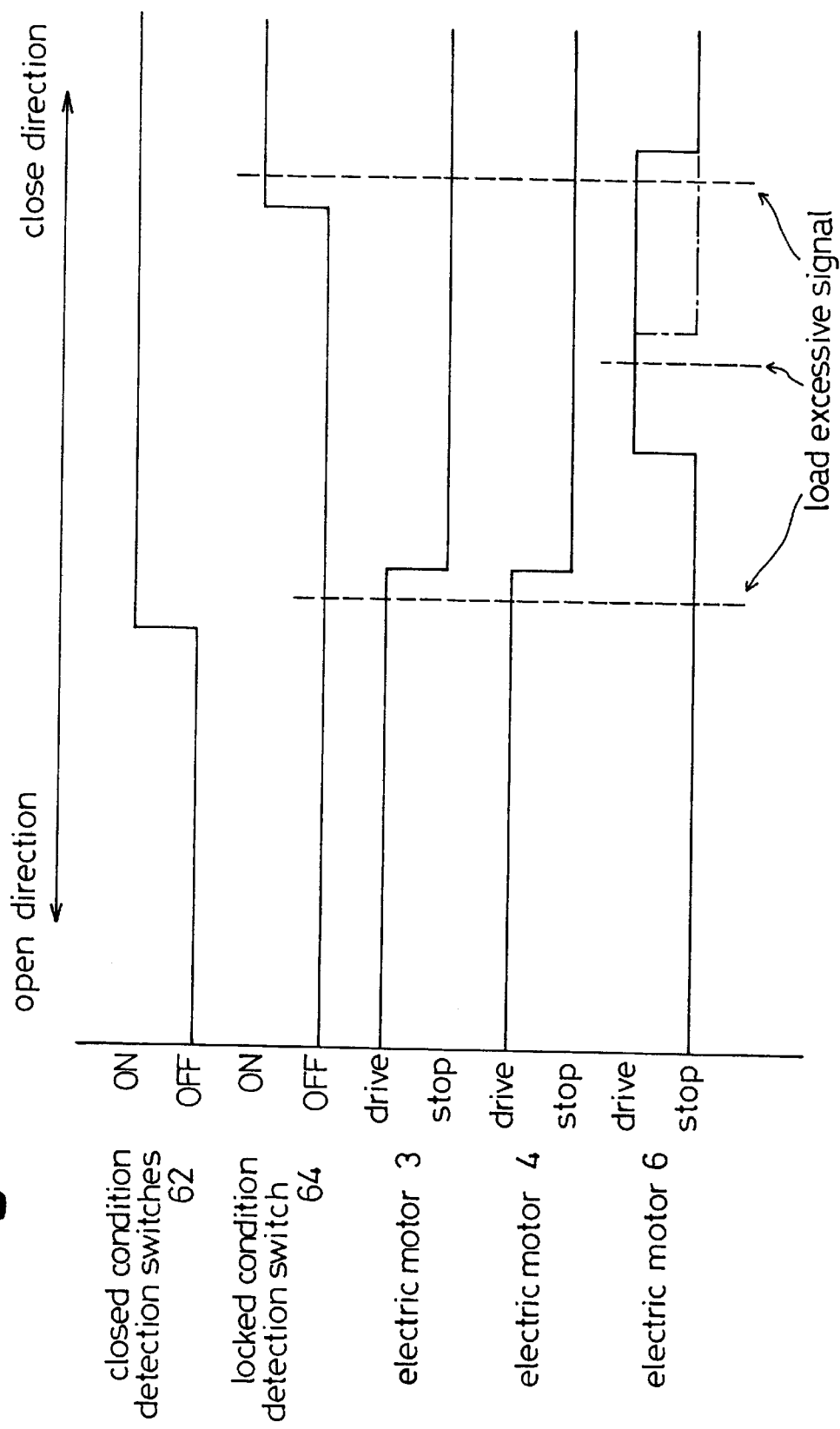

CONTROL APPARATUS FOR OPENING AND CLOSING A CONVERTIBLE TOP OF A VEHICLE

This application is based on and claims priority under 35 U.S.C. § 119 with respect to Japanese Application No. 2000-049437 filed on Feb. 25, 2000, the entire content of which is incorporated herein by reference.

FIELD OF THE INVENTION

The present invention generally relates to a convertible top of a vehicle. More particularly, the present invention pertains to a control apparatus for opening and closing a vehicle convertible top having a locking mechanism which is arranged between a movable roof and a vehicle body as well as a driving mechanism which is coupled to the locking mechanism to drive the locking mechanism in a locked condition and an unlocked condition.

BACKGROUND OF THE INVENTION

An example of a known control apparatus for opening and closing a convertible top of a vehicle is disclosed in U.S. Pat. No. 4,749,193. The convertible top includes a locking mechanism and a driving mechanism. The locking mechanism is arranged between a movable roof and a vehicle body to hold the movable roof of the vehicle body in a fully closed position. The driving mechanism is coupled to the locking mechanism to drive the locking mechanism between a locked condition and an unlocked condition. The control apparatus also includes a limit switch, a position sensor and a control unit. The limit switch outputs a first signal indicating that the movable roof is closed. The position sensor outputs a second signal indicating that the locking mechanism is in the locked condition. The control unit controls the driving mechanism according to the first signal and the second signal. The control unit effects the driving operation of the driving mechanism when the first signal is inputted to the control unit from the limit switch. Further, the control unit stops the operation of the driving mechanism when the second signal is inputted to the control unit from the position sensor. Therefore, the locking mechanism is turned to the locked condition from the unlocked condition when a signal inputted to the control unit is switched from the first signal to the second signal.

In the above mentioned known control apparatus, while the limit switch outputs the first signal, the movable roof may not always be at the fully closed position because the position of the movable roof is not always stable at the fully closed position by virtue of the construction of the movable roof relative to the vehicle body. Therefore, the locking mechanism may fail to switch to the locked condition from the unlocked condition. That is, the locking mechanism may not be in the locked condition even though the second signal is outputted to the control unit from the position sensor.

A need thus exists for an improved vehicle convertible top control apparatus that is able to address at least the drawbacks noted above.

SUMMARY OF THE INVENTION

According to one aspect of the invention, a control apparatus adapted to open and close a convertible top of a vehicle includes first detecting device for outputting a first signal representing that a movable roof of the vehicle is closed, a second detecting device for outputting a second signal representing that a locking mechanism is in a locked condition, a third detecting device for outputting a third signal representing that a driving mechanism is turned to an excessive load condition, and a control device for controlling the driving mechanism according to the first signal, the second signal and the third signal. The control device has a processing mechanism for executing an error step when the third signal is inputted to the control device and the second signal is not inputted to the control device while the first signal is inputted to the control device.

Another aspect of the invention involves a control apparatus for opening and closing a convertible top of a vehicle which includes a locking mechanism arranged between a movable roof and a vehicle body for holding the movable roof in a closed position and a motor operatively connected to the locking mechanism to drive the locking mechanism between a locked condition and an unlocked condition upon supply of electric current. The control apparatus includes a closed condition detection switch that detects the closed position of the movable roof and outputs a signal upon detection of the closed position of the movable roof, a locked condition detection switch that detects the locked condition of the locking mechanism and outputs a signal upon detection of the locked condition of the locking mechanism, an excessive electric current detection circuit that detects excessive electric current supplied to the motor and outputs a signal upon detection of excessive electric current supplied to the motor, and a controller that receives the signals outputted from the closed condition detection switch, the locked condition detection switch and the excessive electric current detection circuit to stop operation of the motor when the controller, upon receiving the signal from the excessive electric current detection circuit after receiving the signal from the closed condition detection switch, does not receive the signal from the locked condition detection switch.

Another aspect of the invention involves a method for detecting an error associated with operation of a convertible top of a vehicle that includes a locking mechanism arranged between a movable roof and a vehicle body for holding the movable roof in a closed position and a driving mechanism operatively connected to the locking mechanism to drive the locking mechanism between a locked condition and an unlocked condition. The method includes detecting that the movable roof has reached a fully closed position, detecting an excessive load condition of the driving mechanism while the driving mechanism is driving the locking mechanism towards the locked condition, and determining the occurrence of an error upon detecting the excessive load condition of the driving mechanism after detecting that the movable roof has reached the fully closed position and in the absence of a detection that the locking mechanism has reached the locked condition.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements and wherein:

FIG. 4 is a timing chart of the controller according to the present invention.

DETAILED DESCRIPTION OF THE INVENTION

Figure 1:
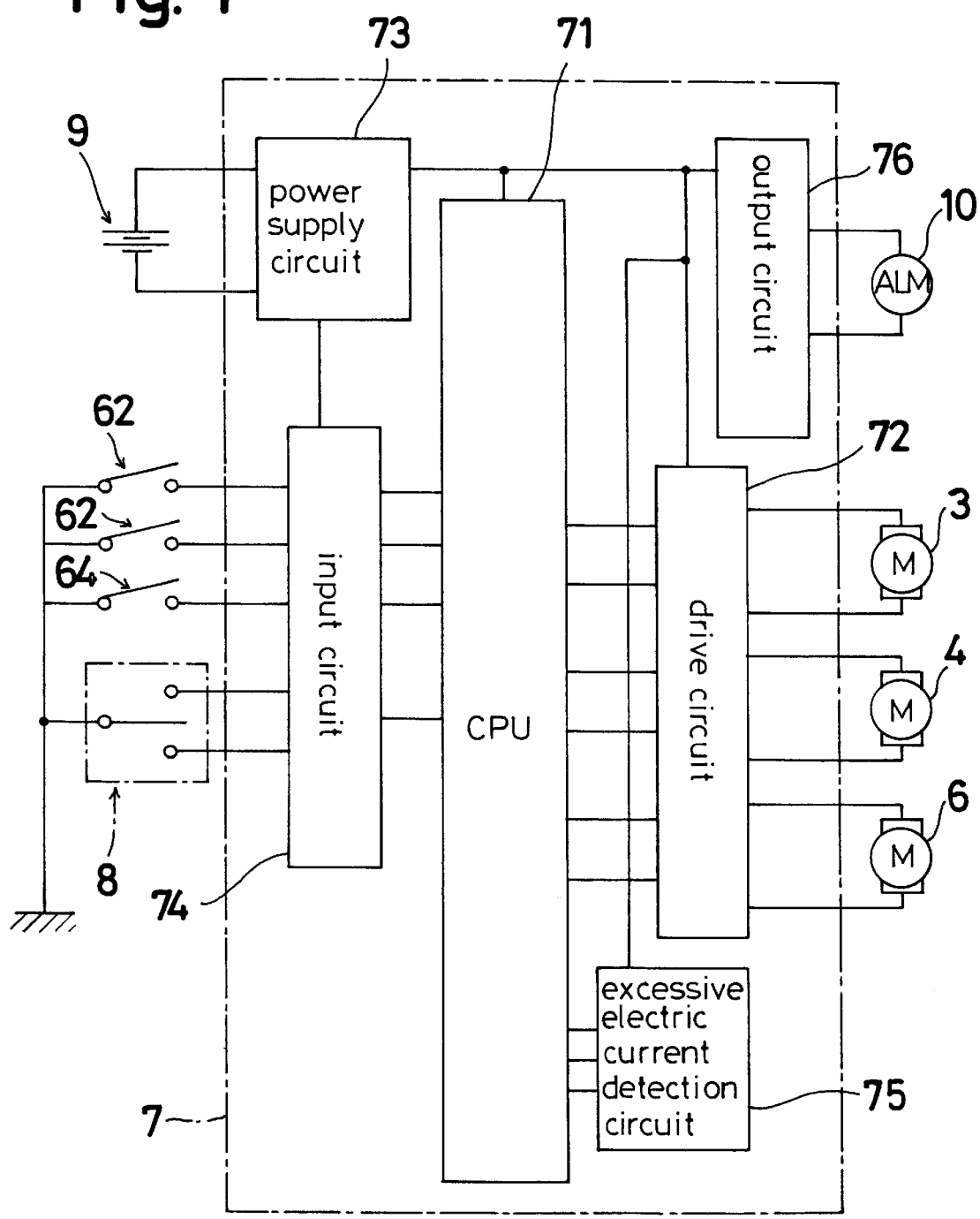
FIG. 1 is a schematic diagram of the vehicle convertible top controller according to the present invention.

A control apparatus for opening and closing a convertible top of a vehicle in accordance with the present invention is described below with reference to FIGS. 1–4. Referring initially to FIG. 3, a convertible top 2 of a vehicle 1 includes a movable roof panel 21 and a movable back panel 22. The convertible top 2 is movably supported on a rear fender panel 11 of the vehicle 1 by a pair of roof link mechanisms (not shown) so that the convertible top 2 is moved between an opened condition and a closed condition (as shown in FIG. 3). When the convertible top 2 is in the opened condition, the convertible top 2 is accommodated under a trunk lid 13 of a rear portion of the vehicle 1. When the convertible top 2 is in the closed condition, the movable roof panel 21 is positioned at a fully closed position A shown in FIG. 2 so that the front end portion 21a of the movable roof panel 21 is held at a front roof pillar 12 of the vehicle 1. The roof link mechanisms are coupled to electric motors 3, 4 generally shown in FIG. 1. The drive force generated by the electric motors 3, 4 is transmitted to the roof link mechanisms so that the roof link mechanisms cause the convertible top 2 to move between the opened condition and the closed condition.

As shown in FIG. 3, a pair of locking mechanisms 5, 5 is arranged between the front end portion 21a of the movable roof panel 21 and the front roof pillar 12 of the vehicle 1. The locking mechanisms 5, 5 are coupled to an electric motor 6 that drives the locking mechanisms 5, 5. Upon operation, the locking mechanisms 5, 5 turn between a locked condition and an unlocked condition.

Figure 2:
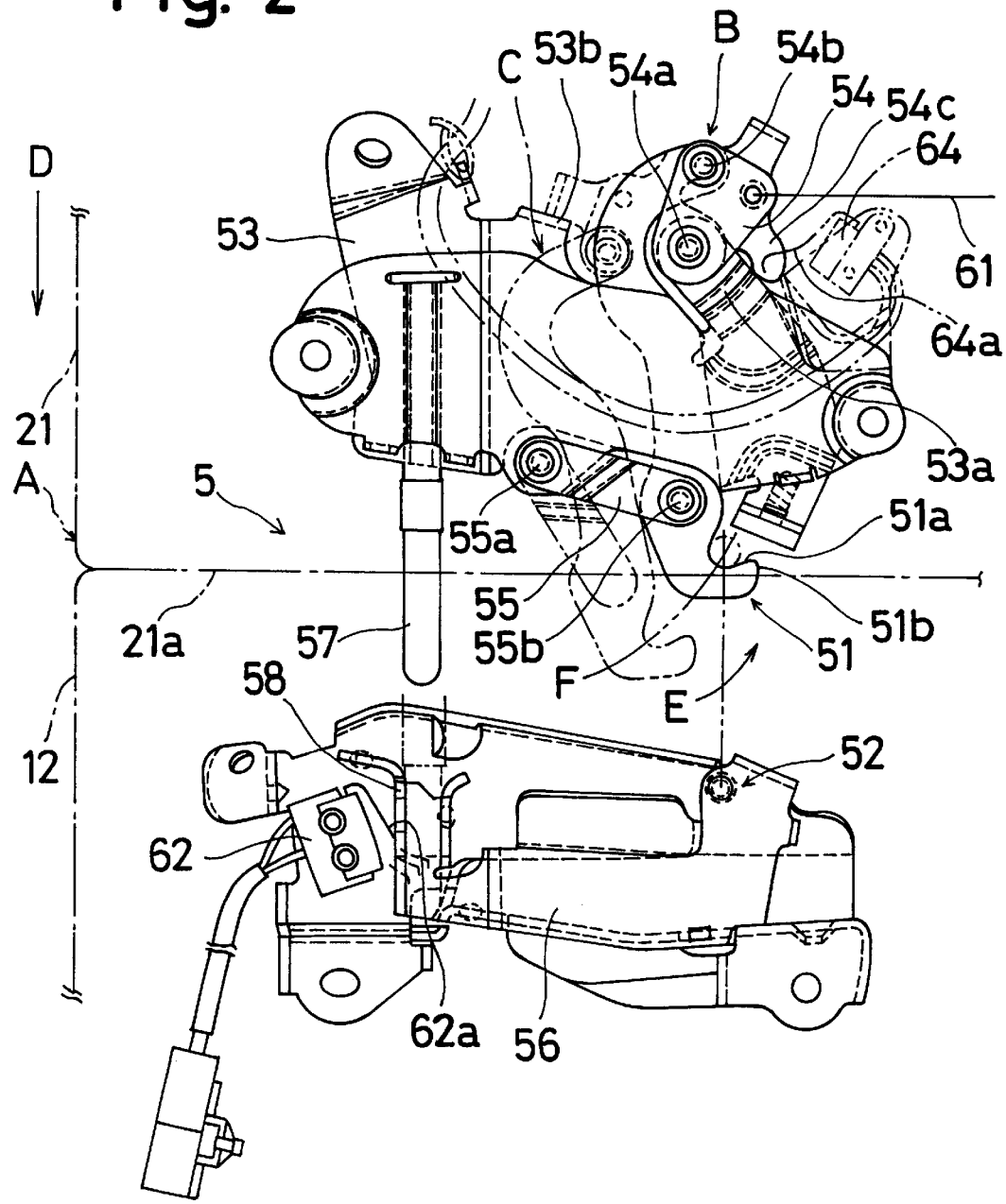
FIG. 2 is a front view of a locking mechanism used in the vehicle convertible top according to the present invention.
Figure 3:
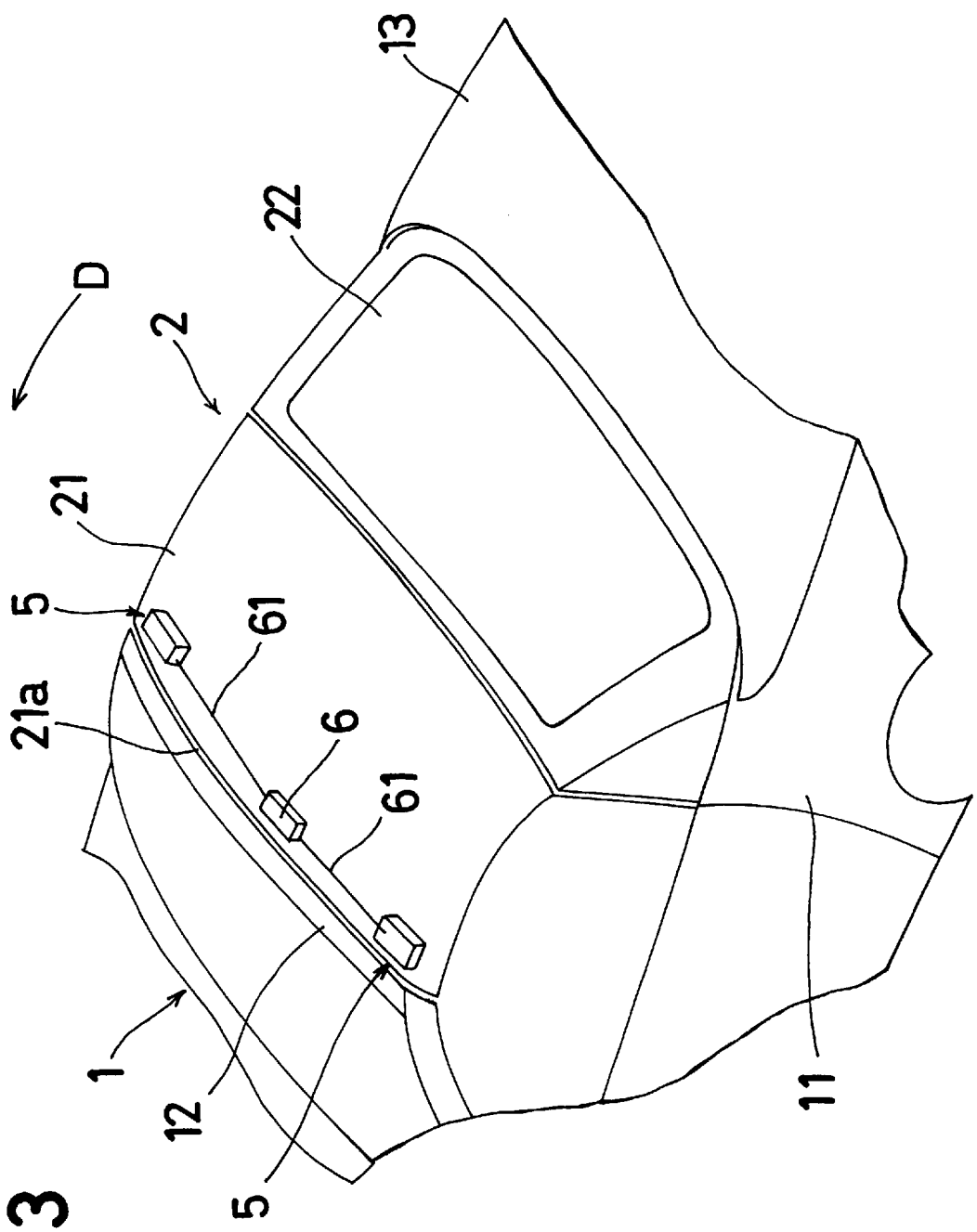
FIG. 3 is a perspective view of the vehicle convertible top according to the present invention.

As shown in FIG. 2, the locking mechanisms 5, 5 include a hook 51, an engaging pin 52, a load receiving pin 57 and a receiving member 58. The hook 51 is movably supported on a base bracket 53 by a pair of links 54, 55. The base bracket 53 is attached on the front end portion 21a of the movable roof panel 21. The link 54 is rotatably supported on the base bracket 53 by a pin 54a. One end of the link 55 is rotatably supported on the base bracket 53 by a pin 55a. The hook 51 is rotatably supported on the link 54 by a pin 54b and is rotatably supported on opposite end of the link 55 by a pin 55b. An engaging groove 51a is formed on the side of the hook 51. The link 55 is connected to the electric motor 6 via a rod 61. The drive force generated by the electric motor 6 is transmitted to the hook 51 through the rod 61 and the link 54. Therefore, the hook 51 moves to be turned between a fully locked position B in which the locking mechanism 5 is in the locked condition and a fully unlocked position C in which the locking mechanism 5 is in the unlocked condition. While the hook 51 moves, the engaging groove 51a of the hook 51 is moved on an arc locus F around the pin 55a by the link 55. An integral contacting portion 51b of the hook 51 is formed on the hook 51 with the engaging portion 51a.

The engaging pin 52 is fixed on a base bracket 56. The base bracket 56 is attached on the front roof pillar 12 of the vehicle 1 so as to be positioned opposite the engaging groove 51a. When the engaging pin 52 is positioned on the arc locus F of the engaging groove 51a and the movable roof panel 21 is positioned at the fully closed position A, the engaging pin 52 is engageable with and disengageable from the engaging groove 51a. When the engaging pin 52 is not positioned on the arc locus F of the engaging groove 51a and the movable roof panel 21 is not positioned at the fully closed position A, the engaging pin 52 is not able to be engageable with and disengageable from the engaging portion 51a and contactable with the contacting portion 51b of the hook 51. When the hook 51 is positioned in the fully locked position B, the engaging pin 52 is engaged with the engaging groove 51a and the link 54 contacts a stopper portion 53a formed on the base bracket 53. When the hook 51 is positioned in the fully unlocked position C, the engaging pin 52 is disengaged from the engaging groove 51a and the link 54 is contacted to a stopper portion 53b formed on the base bracket 53.

The load receiving pin 57 is fixed on the base bracket 53. The receiving member 58 is fixed on the base bracket 56 in opposition to the load receiving pin 57. When the movable roof panel 21 of the convertible top 2 is positioned at the fully closed position A, the load receiving pin 57 is fitted into the receiving member 58. Therefore, the force loading the movable roof panel 21 is transmitted to the front roof pillar 12 of the vehicle 1 via the load receiving pin 57 and the receiving member 58.

As shown in FIG. 1, a controller 7 for controlling operation of the vehicle convertible top includes a central processing unit (CPU) 71, a motor drive circuit 72, a power supply circuit 73, an input circuit 74, an excessive electric current detection circuit 75 and an output circuit 76. The CPU 71 is a micro processor. The electric motors 3, 4, 6 are electrically connected to an output port of the CPU 71 through the motor drive circuit 72. A pair of closed condition detection switches 62, 62, a locked condition detection switch 64 and an operation switch 8 are electrically connected to an input port of the CPU 71 through the input circuit 74. An alarm 10 is electrically connected to an output port of the CPU 71 through the output circuit 76. A battery 9 of the vehicle 1 is electrically connected to the power supply circuit 73. The power supply circuit 73 is electrically connected to the CPU 71, the motor drive circuit 72, the power supply circuit 73, the input circuit 74 and the output circuit 76 to supply electric power to the CPU 71 and the circuits 72, 73, 74 and 76.

The excessive electric current detection circuit 75 is electrically disposed between the motor drive circuit 72 and the power supply circuit 73. The excessive electric current detection circuit 75 monitors the electric current supplied to the electric motors 3, 4, 6 through the motor drive circuit 72. The excessive electric current detection circuit 75 is also electrically connected to the CPU 71. When the value of the electric current supplied to the electric motors 3, 4, 6 exceeds a predetermined value, the excessive electric current detection circuit 75 outputs an excessive load signal to the CPU 71.

As shown in FIG. 2, the locked condition detection switch 64 is fixed on the base bracket 53 of one of the locking mechanisms 5. A movable contact 64a of the locked condition detection switch 64 is arranged for contacting engagement with a contact arm 54c of the link 54. The movable contact 64a of the locked condition detection switch 64 contacts the contact arm 54c of the link 54 when the hook 51 is positioned at a predetermined position between the fully locked position B and the fully unlocked position C of the hook 51. The locked condition detection switch 64 outputs an ON signal to the CPU 71 through the input circuit 74 when the movable contact 64a contacts the contact arm 54c of the link 54.

The closed condition detection switches 62, 62 are fixed on the base bracket 56 of both locking mechanisms 5, 5. A movable contact 62a of the closed condition detection switch 62 is arranged for contacting engagement with the load receiving pin 57. The movable contact 62a contacts the load receiving pin 57 when the movable panel 21 is positioned at a predetermined position arranged on the open side relative to the fully closed position A. The closed condition detection switch 62 outputs an ON signal to the CPU 71 through the input circuit 74 when the movable contact 62a contacts the receiving pin 57.

As shown in FIGS. 1, 2, 3 and 4, while the movable roof 2 moves toward the closed direction D (as shown in FIG. 3) by the operation of the electric motors 3, 4, the receiving pin 57 fits into or is received in the receiving member 58 and the front end portion 21a of the movable roof panel 21 contacts the front roof pillar 12 of the vehicle 1. The receiving pin 57 contacts the movable contact 62a of the closed condition detection switch 62 and the electric current supplied to the electric motor 3, 4 exceeds the predetermined value by contact between the front roof pillar 12 and the front end portion 21a of the movable roof panel 21. Therefore, the closed condition detection switch 62 outputs the ON signal to the CPU 71 and the excessive electric current detection circuit 75 outputs the load excessive signal to the CPU 71.

When the ON signal outputted by the closed condition detection switches 62 and the load excessive signal outputted by the excessive electric current detection circuit 75 are inputted to the CPU 71, the CPU 71 outputs a stop signal to the motor drive circuit 72. Therefore, the operation of the electric motors 3, 4 is stopped. As a result, the movable roof panel 21 is positioned at the fully closed position A. The CPU 71 outputs a drive signal to the motor drive circuit 72 when a predetermined time is passed after the output of the stopped signal. Therefore, the electric motor 6 is operated or driven.

The operation of the motor 6 causes the hook 51 to move toward a lock direction E as shown in FIG. 2 from the unlocked position C. The contact arm 54c contacts the movable contact 64a of the switch 64 and the link 54 contacts the stopper portion 53a of the base bracket 53. The electric current supplied to the electric motor 6 exceeds the predetermined value by virtue of the contact between the stopper portion 53a and the link 54. Therefore, the locked condition detection switch 64 outputs the ON signal to the CPU 71 and the excessive electric current detection circuit 75 outputs the load excessive signal to the CPU 71. When the ON signal from the locked condition detection switch 64 and the load excessive signal from the excessive electric current detection circuit 75 are inputted to the CPU 71, the CPU 71 outputs a stop signal to the motor drive circuit 72. Therefore, the operation of the electric motor 6 is stopped. As a result, the hook 51 is positioned at the fully locked position B.

When the engaging pin 52 is positioned on the arc locus F of the engaging groove 51a of the hook 51 while the hook 51 moves toward the lock direction E (as shown in FIG. 2) by the operation of the electric motor 6, the engaging pin 52 is engaged with the engaging groove 51a of the hook 51. Therefore, the movable roof panel 21 is held against the front roof pillar 12 by the locking mechanisms 5, 5. When the engaging pin 52 is not positioned on the arc locus F of the engaging groove 51a of the hook 51 while the hook 51 moves toward the lock direction E (as shown in FIG. 2) by the operation of the electric motor 6, the engaging pin 52 contacts the contacting portion 51b of the hook 51. The contact arm 54c of the link 54 does not contact the movable contact 64a of the locked condition detection switch 64 and the electric current supplied to the electric motor 6 exceeds the predetermined value by contact between the engaging pin 52 and the contacting portion 51b of the hook 51. Therefore, the locked condition detection switch 64 does not output the ON signal to the CPU 71 and the excessive electric current detect circuit 75 outputs the load excessive signal to the CPU 71.

The error step is executed by the CPU 71 in the following manner. When the ON signal outputted by the locked condition detection switch 64 is not inputted to the CPU 71 and the load excessive signal outputted by the excessive electric current detection circuit 75 is inputted to the CPU 71, the CPU 71 outputs an error signal to the output circuit 76 and a stop signal to the motor drive circuit 72. Therefore, the alarm 10 warns the user of the vehicle 1 and the electric motor 6 is stopped. While the hook 51 moves toward the lock direction E (as shown in FIG. 2) by the electric motor 6, although the closed condition detection switch 62 outputs the ON signal to the CPU 71, the CPU 71 outputs the error signal to the output circuit 76.

In accordance with the present invention, it is possible to substitute a torque and/or revolution sensor for detecting the torque and/or revolution of the electric motors 3, 4, 6 for the excessive electric current detection circuit 75.

The principles, preferred embodiment and mode of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A control apparatus for opening and closing a convertible top of a vehicle which includes a locking mechanism arranged between a movable roof and a vehicle body for holding the movable roof in a fully closed position and a driving mechanism connected to the locking mechanism to drive the locking mechanism between a locked condition and an unlocked condition and switchable to an excessive load condition when the locking mechanism is mechanically stopped comprising:

first detecting means for outputting a first signal representing that the movable roof is closed;

second detecting means for outputting a second signal representing that the locking mechanism is in the locked condition;

third detecting means for outputting a third signal representing that the driving mechanism has reached the excessive load condition; and control means for controlling the driving mechanism according to the first signal, the second signal and the third signal, the control means including processing means for executing an error step when the third signal is inputted to the control means and the second signal is not inputted to the control means while the first signal is inputted to the control means.

2. The control apparatus according to claim 1, wherein the control means includes a drive circuit electrically connected to the processing means as well as the driving mechanism, and the processing means outputs a stop signal to the drive circuit to stop the drive of the driving mechanism when the first signal, the second signal and the third signal are inputted to the control means.

3. The control apparatus according to claim 2, wherein the processing means outputs the stop signal to the drive circuit to stop the drive of the driving mechanism during the error step.

4. The control apparatus according to claim 1, further comprising warning means for warning a user of the vehicle, wherein the control means includes an output circuit electrically connected to the processing means as well as the warning means, and the processing means outputs an error signal to the output circuit for actuating the warning means during the error step.

5. The control apparatus according to claim 1, the locking mechanism includes a hook movably supported on the movable roof, an engaging pin supported on the vehicle body and engageable with and disengageable from the hook.

6. A control apparatus for opening and closing a convertible top of a vehicle which includes a locking mechanism arranged between a movable roof and a vehicle body for holding the movable roof in a closed position and a motor operatively connected to the locking mechanism to drive the locking mechanism between a locked condition and an unlocked condition upon supply of electric current comprising:
   a closed condition detection switch detecting the closed position of the movable roof and outputting a signal upon detection of the closed position of the movable roof;
   a locked condition detection switch detecting the locked condition of the locking mechanism and outputting a signal upon detection of the locked condition of the locking mechanism;
   an excessive electric current detection circuit detecting excessive electric current supplied to the motor and outputting a signal upon detection of the excessive electric current supplied to the motor; and
   a controller receiving the signals outputted from the closed condition detection switch, the locked condition detection switch and the excessive electric current detection circuit to stop operation of the motor when the controller, upon receiving the signal from the excessive electric current detection circuit after receiving the signal from the closed condition detection switch, does not receive the signal from the locked condition detection switch.

7. The control apparatus according to claim 6, wherein the controller includes a drive circuit electrically connected to a processing means as well as the motor, and the processing means outputs a stop signal to the drive circuit to stop the drive of the motor when the controller receives the signals outputted from the closed condition detection switch, the locked condition detection switch and the excessive electric current detection circuit.

8. The control apparatus according to claim 6, further comprising warning means for warning a user of the vehicle of the occurrence of an error when the controller, upon receiving the signal from the excessive electric current detection circuit after receiving the signal from the closed condition detection switch, does not receive the signal from the locked condition detection switch.

9. The control apparatus according to claim 6, wherein the locking mechanism includes a hook movably supported on the movable roof, an engaging pin supported on the vehicle body and engageable with and disengageable from the hook.

10. A method for detecting an error associated with operation of a convertible top of a vehicle that includes a locking mechanism arranged between a movable roof and a vehicle body for holding the movable roof in a fully closed position and a driving mechanism operatively connected to the locking mechanism to drive the locking mechanism between a locked condition and an unlocked condition, comprising:
   detecting that the movable roof has reached the fully closed position;
   detecting an excessive load condition of the driving mechanism while the driving mechanism is driving the locking mechanism towards the locked condition; and
   determining an error upon detecting the excessive load condition of the driving mechanism after detecting that the movable roof has reached the fully closed position and in the absence of a detection that the locking mechanism has reached the locked condition.

11. The method according to claim 10, wherein the fully closed position of the movable roof is detected by a closed condition detection switch that outputs a signal to a controller upon detection of the fully closed position of the movable roof.

12. The method according to claim 10, wherein the locked condition of the locking mechanism is detected by a locked condition detection switch that outputs a signal to a controller upon detection of the locked condition of the locking mechanism.

13. The method according to claim 10, wherein the driving mechanism includes a motor and the excessive load condition is determined by an excessive electric current detection circuit that outputs a signal to a controller upon detection of excessive electric current supplied to the motor.

14. The method according to claim 10, including outputting a warning to a driver of the vehicle upon determination of the error.

15. The control apparatus according to claim 1, wherein the processing means executes a normal step to output a stop signal to the driving mechanism when the third signal is inputted to the control means after the second signal is inputted to the control means.

16. The control apparatus according to claim 6, wherein the controller also stops operation of the motor when the controller receives the signal from the excessive electric current detection circuit after receiving the signal from the closed condition detection switch and the signal from the locked condition detection switch.

17. The method according to claim 10, including determining a normal operation upon detecting the excessive load condition of the driving mechanism after detecting that the movable roof has reached the fully closed position and that the locking mechanism has reached the locked condition.

* * * * *